US010259289B2

(12) United States Patent
Panterott et al.

(10) Patent No.: US 10,259,289 B2
(45) Date of Patent: Apr. 16, 2019

(54) INFLOW ELEMENT, ESPECIALLY FOR A COMBUSTION AIR FLOW PATH IN A VEHICLE HEATER

(71) Applicant: Eberspächer Climate Control Systems GmbH & Co. KG, Esslingen (DE)

(72) Inventors: Thomas Panterott, Aalen (DE); Robert Apfelbeck, Ludwigsburg (DE); Thorsten Findeis, Albershausen (DE); Andreas Collmer, Aichwald (DE); Frank Barthel, Friolzheim (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 1134 days.

(21) Appl. No.: 14/337,945

(22) Filed: Jul. 22, 2014

(65) Prior Publication Data

US 2015/0028118 A1    Jan. 29, 2015

(30) Foreign Application Priority Data

Jul. 23, 2013   (DE) .................. 10 2013 214 387

(51) Int. Cl.
*B60H 1/22*     (2006.01)
*F23L 1/00*     (2006.01)
*F23M 9/02*     (2006.01)

(52) U.S. Cl.
CPC .............. *B60H 1/2203* (2013.01); *F23L 1/00* (2013.01); *F23M 9/02* (2013.01); *B60H 2001/2281* (2013.01)

(58) Field of Classification Search
CPC .......... B60H 1/2203; B60H 1/26; B60H 1/30; F23L 1/00; F23M 9/02; B01D 45/06; B01D 46/24; B01D 46/2414; B01D 45/08
(Continued)

(56) References Cited

U.S. PATENT DOCUMENTS

| 421,017 A | * | 2/1890 | Stein | ...................... B01D 45/08 |
| | | | | 55/423 |
| 1,917,310 A | * | 7/1933 | Lesage | ................. F02M 35/022 |
| | | | | 55/391 |

(Continued)

FOREIGN PATENT DOCUMENTS

| DE | 10 2006 027 188 A1 | 12/2007 |
| DE | 20 2008 000097 U1 | 10/2008 |

(Continued)

OTHER PUBLICATIONS

Cheze, et al., FR 2870755 A1 English machine translation, Dec. 2, 2005.*

*Primary Examiner* — Gregory L Huson
*Assistant Examiner* — Phillip Decker
(74) *Attorney, Agent, or Firm* — McGlew and Tuttle, P.C.

(57) ABSTRACT

A combustion air inflow path, for a vehicle heater, includes a bottom area (24) and an outer circumferential wall (26) adjoining the bottom area (24) and extending essentially in the direction of a central longitudinal axis (L) of the inflow element (22). An inner circumferential wall (32) is arranged at a radially spaced location from the outer circumferential wall (26) and defines a space area (52) with same. An inflow opening arrangement (38) is provided for the inflow of air into the inflow element (22). The inflow opening arrangement (38) is provided in the bottom area (24) and is designed to generate a turbulent flow.

17 Claims, 1 Drawing Sheet

(58) Field of Classification Search
USPC .................. 237/46, 12.3 C; 454/254, 339
See application file for complete search history.

(56) References Cited

U.S. PATENT DOCUMENTS

| | | | | |
|---|---|---|---|---|
| 4,203,718 | A * | 5/1980 | Tracy | F23C 7/008 239/407 |
| 4,471,754 | A * | 9/1984 | Galtz | B60H 1/2212 126/110 B |
| 5,674,066 | A * | 10/1997 | Hausermann | F23C 7/002 431/173 |
| 5,753,000 | A * | 5/1998 | Chiu | B01D 46/24 55/357 |
| 6,027,334 | A * | 2/2000 | Blaschke | F23D 3/40 126/116 R |
| 6,220,387 | B1 * | 4/2001 | Hoppes | F01N 1/14 181/227 |
| 6,264,712 | B1 * | 7/2001 | Decker | B01D 45/08 55/445 |
| 6,321,870 | B1 * | 11/2001 | Waronitza | B60H 1/2203 181/214 |
| 6,438,961 | B2 * | 8/2002 | Tuthill | F23C 7/004 60/737 |
| 6,797,024 | B2 * | 9/2004 | Inoue | B01D 50/002 55/319 |
| 6,811,395 | B2 * | 11/2004 | Schlecht | F23D 3/40 237/12.3 C |
| 7,155,841 | B2 * | 1/2007 | Livingston | F26B 11/0413 34/136 |
| 7,311,745 | B2 * | 12/2007 | Gemmati | B64D 13/00 55/385.3 |
| 7,632,324 | B2 * | 12/2009 | Makarov | A47L 5/30 15/350 |
| 7,661,661 | B2 * | 2/2010 | Schmidt | F23L 1/00 261/104 |
| 7,976,597 | B2 * | 7/2011 | Smith | A47L 9/1625 15/352 |
| 8,066,096 | B1 * | 11/2011 | Francisco | B64D 33/02 181/214 |
| 8,758,101 | B2 * | 6/2014 | Khalitov | F04D 17/06 181/198 |
| 9,761,416 | B2 * | 9/2017 | Nguyen | H01J 37/32495 |
| 9,822,741 | B2 * | 11/2017 | Holzmann | F02M 35/10137 |
| 2006/0257254 | A1 * | 11/2006 | Ho | F04D 29/545 415/220 |
| 2010/0326396 | A1 * | 12/2010 | Patel | B01D 46/527 123/198 E |
| 2011/0114741 | A1 | 5/2011 | Kaindl | |
| 2014/0165514 | A1 * | 6/2014 | Licht | B01D 45/08 55/423 |

FOREIGN PATENT DOCUMENTS

| | | |
|---|---|---|
| DE | 10 2008 028316 A | 12/2009 |
| EP | 10 29 723 B1 | 5/2003 |
| EP | 1 574 782 A2 | 9/2005 |
| EP | 1 839 921 A1 | 10/2007 |
| EP | 1 867 922 A2 | 12/2007 |
| FR | 2 870 755 A1 | 12/2005 |
| SU | 511480 A * | 8/1976 |

\* cited by examiner

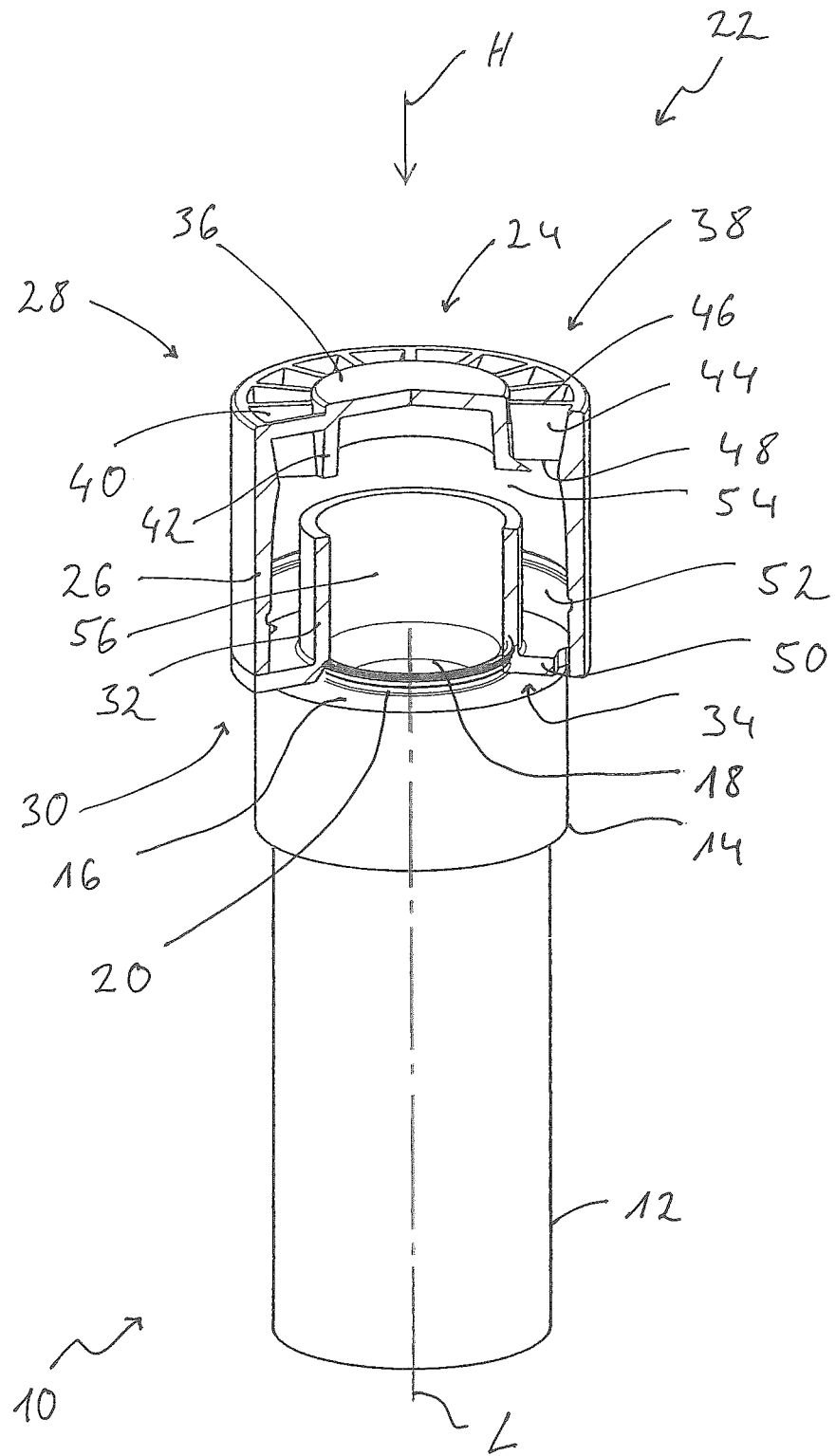

INFLOW ELEMENT, ESPECIALLY FOR A COMBUSTION AIR FLOW PATH IN A VEHICLE HEATER

CROSS REFERENCE TO RELATED APPLICATIONS

This application claims the benefit of priority under 35 U.S.C. § 119 of DE 10 2013 214 387.7 filed Jul. 23, 2013, the entire contents of which are incorporated herein by reference.

FIELD OF THE INVENTION

The present invention pertains to an inflow element, especially for a combustion air inflow path for a vehicle heater, comprising a first bottom area and an outer circumferential wall adjoining the first bottom area and extending essentially in the direction of a central longitudinal axis of the inflow element, a first inner circumferential wall arranged at a radially spaced location from the outer circumferential wall and defining with this a space area, as well as an inflow opening arrangement for the inflow of air into the inflow element.

BACKGROUND OF THE INVENTION

Such an inflow element is known from EP 1 029 723 B1. An inflow opening arrangement comprising a plurality of inflow openings arranged distributed is provided in the outer circumferential wall and the first inner circumferential wall of this prior-art inflow element. The main direction of inflow of the air entering the inflow element is oriented essentially radially in relation to the central longitudinal axis of the inflow element. Moisture, which is being transported in the air flowing into the inflow element, can precipitate in the space area enclosed by the outer circumferential wall and also by the first inner circumferential wall in order to separate the air passed on in the direction of vehicle heater from water droplets or the like.

SUMMARY OF THE INVENTION

An object of the present invention is to provide an inflow element, especially for a combustion air inflow path for a vehicle, with which particles contained in the air being transported can be separated with a higher reliability.

This object is accomplished according to the present invention by an inflow element, especially for a combustion air inflow path for a vehicle heater, comprising:
- a first bottom area and an outer circumferential wall, which adjoins the first bottom area and extends essentially in the direction of a central longitudinal axis of the inflow element,
- a first inner circumferential wall, which is arranged at a radially spaced location from the outer circumferential wall and defines with this a space area, and
- an inflow opening arrangement for the inflow of air into the inflow element.

Further, provisions are made for the inflow opening arrangement to be provided in the first bottom area and to be designed to generate a turbulent flow.

It is achieved, firstly, with such a design of an inflow element that a principal direction of inflow also corresponds essentially to the direction of the central longitudinal axis of the inflow element, i.e., to a fictitious axis, which may be oriented, for example, essentially at right angles to the bottom area. In conjunction with the generation of a turbulent flow, the consequence of this is that particles being transported in the air flowing into the inflow element, i.e., for example, water droplets or dust particles or the like, are transported radially to the outside based on the centrifugal force generated in the turbulent flow and thus the space area formed between the outer circumferential wall and the first inner circumferential wall, where they precipitate and are not transported farther with the air flowing through the inflow element.

A design of the inflow opening arrangement that effectively supports the generation of the turbulent flow may make provisions for this inflow opening arrangement to comprise a plurality of inflow openings arranged such that they follow each other around a first bottom wall of the first bottom area and flow guide elements associated with these. The first bottom wall may be arranged essentially centrally here in relation to the central longitudinal axis. An embodiment in which the bottom wall is located axially opposite a discharge opening of the inflow element or/and is arranged in the same radial area as this discharge opening may be especially advantageous in this connection. Air flowing in through the bottom area and particles being transported therein can thus be essentially prevented from directly entering the discharge opening.

The turbulent flow used to separate particles being transported in the air can be generated effectively by providing a flow guide element between at least two, and preferably all inflow openings following one another.

Since the turbulent flow has an essentially ring-shaped flow pattern, for example, in relation to the central longitudinal axis, provisions may be made for an efficient generation of the turbulent flow for the inflow openings to be arranged in a ring-shaped configuration around the first bottom wall.

A stable design of the inflow element, which also supports the defined generation of the turbulent flow, may be designed such that the flow guide elements are arranged between a second inner circumferential wall adjoining the first bottom wall and the outer circumferential wall. The flow guide elements may be preferably arranged with an equal pitch or/and with a pitch in the same direction in relation to a principal direction of inflow, which may be oriented, for example, essentially in parallel to the central longitudinal axis of the inflow element, so that they act in the manner of turbine blades and can bring about a deflection of the air arriving in the principal direction of inflow. Provisions may be made for this, for example, for end areas of the flow guide elements, which end areas are upstream end areas in relation to the principal direction of inflow, are offset to downstream end areas of the flow guide elements in the circumferential direction.

To make it possible to support the accumulation of the particles being transported to the outside in the radial direction by the turbulent flow in the space area between the outer circumferential wall and the first inner circumferential wall, provisions are made for the inflow opening arrangement to be arranged axially opposite the space area formed between the outer circumferential wall and the first inner circumferential wall or/and essentially in the same radial area.

The space area formed between the outer circumferential wall and the first inner circumferential wall may be defined axially by a second bottom area.

This second bottom area may comprise a bottom wall, which may have, for example, a ring-shaped design and may adjoin the outer circumferential wall and the first inner circumferential wall. Further, this second bottom wall is advantageously located axially opposite the inflow opening arrangement. It can thus be guaranteed that the air flowing in through the inflow opening arrangement, which may possibly be transporting particles, will first enter the space area and particles being transported radially to the outside are collected in the space area and can precipitate, for example, in the area of the second bottom wall or also of the outer circumferential wall.

To make it possible to generate a labyrinth-like passage of the air through the inflow element, it is proposed that the first inner circumferential wall to end in the direction of the central longitudinal axis at a spaced location from the first bottom area or/and to surround a discharge opening.

The present invention pertains, further, to an inflow assembly unit, especially for a combustion air inflow path for a vehicle heater, comprising an inflow element designed according to the present invention as well as an air flow sound muffler with an air inlet area. The air flow sound muffler can absorb the air flowing through and leaving the air inlet area.

To make possible the passage of air flowing through the inflow element into the air flow sound muffler, it is proposed that the air inlet area comprise an inlet opening that is in connection with the discharge opening surrounded by the first inner circumferential wall.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1 is a perspective view of an inflow element provided at a combustion air inflow path for a vehicle heater, which view is shown partially in a longitudinal section.

DESCRIPTION OF THE PREFERRED EMBODIMENTS

Referring to the drawing in particular, a combustion air inflow path 10 shown in FIG. 1 has an upstream end area for a vehicle heater that comprises a flow tube 12, which extends, for example, as a straight tube in the upstream end area. An air flow sound muffler 14 is provided at the flow tube. This sound muffler 14 may be of a known design and does not need to be described in more detail here. The air flow sound muffler 14 has, in the area of a front wall 16, a central inlet opening 18, which is surrounded by an axially extending edge area 20 starting from the front wall 16. Through the central inlet opening 18, the air being delivered by a blower, not shown, can be delivered, for example, to the combustion area of a vehicle heater.

An inflow element generally designated by 22 is arranged upstream of the air flow sound muffler 14. This inflow element 22 is provided and designed essentially for separating particles being transported in the air flowing into the air inflow path 10. For example, moisture particles or dust particles are separated from the air, so that such foreign bodies are essentially removed from the air being transported farther to a heater.

The inflow element 22 comprises a first bottom area 24, whose radially outer area is adjoined by an outer circumferential wall 26. The first bottom area 24 and the outer circumferential wall 26 form an essentially pot-like configuration and may be integral components of a first housing part 28 of the inflow element 22, which housing part is manufactured, for example, from a plastic material.

A second housing part 30 of the inflow element 22, which is likewise made, for example, of a plastic material, comprises a first inner circumferential wall 32, which is arranged radially within the circumferential wall 26 in relation to a central longitudinal axis L of the inflow element 22 and, for example, concentrically thereto, as well as a second bottom area 34, which adjoins the first inner circumferential wall 32 and is made, for example, integrally therewith. In a radially outer area, the second bottom area 34 adjoins the end area of the outer circumferential wall 26. The end area is located axially at a distance, and said outer circumferential wall 26 is, for example, essentially cylindrical or/and has, for example, a circular configuration, and may be connected with this outer circumferential wall 26, for example, by connection in substance.

The first bottom area 24 comprises a first bottom wall 36, which is, for example, disk-like and has, for example, a circular configuration. The first bottom wall 36 is arranged preferably centrally in relation to the central longitudinal axis L. Surrounding the first bottom wall 36 radially on the outside in relation to the central longitudinal axis L, an inlet opening arrangement 38 is formed with a plurality of inlet openings 40 arranged distributed such that they follow each other in the circumferential direction about the central longitudinal axis L. These inlet openings 40 may be designed, for example, such that they extend radially between the radially outer end area of the first bottom wall 36 and the outer circumferential wall 26. Further, a second inner circumferential wall 42 extending in the direction of the first inner circumferential wall 32 may be provided at the first bottom wall 40. Flow guide elements 44 having a plate-like or blade-like design extend between the second inner circumferential wall 42 and the outer circumferential wall 26 between two inflow openings 40 each, which follow each other in the circumferential direction. It is recognized that the wall thickness of the outer circumferential wall 26 increases in the principal direction of flow H in the axial area of the outer circumferential wall 26 in which the flow guide elements 44 extend, so that a corresponding radial tapering of the inlet openings 24 is generated in the direction of flow.

The flow guide elements 44, which separate the inflow openings 40 from one another in the circumferential direction and are thus also arranged such that they follow each other in the circumferential direction, have a pitch in relation to the principal direction of inflow H and in the circumferential direction, so that an upstream end area 46 of a respective flow guide element 44 and a downstream end area 48 of same are located offset in relation to one another in the circumferential direction. The air arriving in the principal direction of inflow H is thus deflected in the circumferential direction due to interaction with the flow guide elements 44. The consequence of this is that a turbulent flow is generated in the air flowing in through the inflow openings 40, and this turbulent flow is limited essentially to the radial area in which the inflow openings 40 are positioned, i.e., an essentially tube-like flow volume is generated. To generate a turbulence that is essentially symmetrical about the central longitudinal axis L, all flow guide elements 44 advantageously have a pitch in the same direction or/and an equal pitch, i.e., their respective upstream end area 46 is offset in the same direction and to the same extent in relation to the respective downstream end area 48.

Located axially opposite the inflow opening arrangement 38, a space area 52 is provided, which is defined radially between the outer circumferential wall 26 and the first inner circumferential wall 32 and is defined axially by a second bottom wall 50 of the second bottom area 34. The air flow entering the inner area of the first housing part 28 through the inflow openings 40 as a turbulent flow enters essentially this space area 52. The second inner circumferential wall 42 extending from the first bottom wall 36 in the direction of the first inner circumferential wall 32 also contributes to this. A direct passage of arriving air through an annular gap-like intermediate space 54 formed between the first inner circumferential wall 32 and the first bottom area 24, especially the second inner circumferential wall 42 thereof, will not essentially occur. The consequence of this is that, based on the turbulent flow and the effect of the centrifugal force generated in the process in the air flowing in through the inflow openings 40, particles being transported are delivered radially to the outside against the inner circumferential wall 26 and axially in the direction of the second bottom wall 50 and are thus deposited in the space area 52. The air can then flow further through the intermediate space 54 into a discharge opening 56, which is surrounded by the first inner circumferential wall 52 and is open towards the inlet opening 18 of the air flow sound muffler 14, through which discharge opening it can leave the inflow element 22 and enter the air flow sound muffler 14 essentially freed from foreign bodies.

A stable connection of the inflow element 22 to the air flow sound muffler 14 can be achieved, for example, by locking action or/and by connecting the second housing part 30 in the area of the second bottom area 34 or of the inner circumferential wall 32 in substance to the edge area 20 extending from the front wall 16 of the air flow sound muffler 14. The assembly of the air flow sound muffler 14 with the inflow element 22 can be brought about easily and, in particular, the air inflow element 22 can be removed correspondingly easily from the air flow sound muffler 14 especially if a locking connection is used.

It should be pointed out that many different variations may be made in the design of an inflow element described above in reference to FIG. 1 without deviating from the basic principle of generating a turbulent flow in the air flowing in through the first bottom area 24. Thus, the outer circumferential wall could be designed, for example, with a configuration expanding or tapering starting from the first bottom area 24. A corresponding shape may also be provided in case of the first inner circumferential wall 32 and the second inner circumferential wall 42. The inflow element does not, of course, have to be designed with the essentially circular cross-sectional geometry shown in FIG. 1. A polygonal configuration, for example, a square or hexagonal cross-sectional configuration, may be provided as well.

The inflow openings 40 provided in a ring-shaped configuration are especially advantageously arranged in the design according to the present invention such that they are located axially opposite the space area 52 between the outer circumferential wall 26 and the first inner circumferential wall 32 and essentially in the same radial area. It is obvious that this does not necessarily mean that the space area 52 and the inflow opening arrangement 38 must be formed in exactly the same radial area and with exactly the same radial extension. The first inner circumferential wall 32 and the second inner circumferential wall 42 also do not have to be designed with the same external or/and internal diameter, even though this may also be advantageous for generating a defined turbulent flow or for forcing the air flow to enter the space area 52.

Furthermore, it should be noted that the central longitudinal axis L may form a symmetry axis especially if the inflow element 26 is provided with the circular configuration recognizable in FIG. 1. However, since the inflow element 22 does not necessarily have to have a rotationally symmetrical or centrally symmetrical design in relation to such an axis, the central longitudinal axis L is a fictitious axis oriented at right angles, for example, to the first bottom area 24 and indicating a principal direction of extension of the inflow element 22 in the sense of the present invention. It should also be stated in reference to the principal direction of inflow H that this indicates an idealized principal direction of inflow. This does not, of course, rule out that the air arriving from the outside arrives in a direction of inflow deviating from this idealized direction of inflow depending on the configuration of other components in the area surrounding the inflow element 22.

Further, it should be noted that the above-described inflow element 22 can be used especially advantageously in connection with a fuel-operated vehicle heater in order to avoid the contamination, for example, of a combustion air delivery blower or of the burner area per se. Such an inflow element may, of course, also be used in connection with other air flow paths in order to prevent particles or impurities being transported in the air to be fed from being transported further.

While specific embodiments of the invention have been shown and described in detail to illustrate the application of the principles of the invention, it will be understood that the invention may be embodied otherwise without departing from such principles.

What is claimed is:

1. An inflow element for a combustion air inflow path for a vehicle heater, the inflow element comprising:
   a bottom area having a bottom wall;
   an outer circumferential wall adjoining the bottom area and extending essentially in the direction of a central longitudinal axis of the inflow element;
   an inner circumferential wall arranged at a radially spaced location from the outer circumferential wall and axially overlapping with the outer circumferential wall, such that a space area is defined radially between the inner circumferential wall and the outer circumferential wall, the inner circumferential wall ending at a spaced location from the bottom area in a direction of the central longitudinal axis, the inner circumferential wall surrounding and defining a discharge opening; and
   an inflow opening arrangement being provided in the bottom area and comprising a plurality of inflow openings arranged following each other in a circumferential direction in a ring-shaped configuration around the bottom wall for the inflow of air into the inflow element, the inflow opening arrangement comprising flow guide elements associated with the inflow openings, one of the flow guide elements being provided between at least two of the inflow openings that follow each other and being designed to generate a turbulent flow, the flow guide elements being arranged between a second inner circumferential wall adjoining the bottom wall and the outer circumferential wall, the inflow opening arrangement and the space area defined radially between the inner circumferential wall and the outer circumferential wall being provided in a same radial area, such that the inflow openings are located axially opposite the space area.

2. The inflow element in accordance with claim 1, wherein:
the bottom wall is arranged essentially centrally in relation to the central longitudinal axis; and
the bottom wall is arranged at least one of axially opposite a discharge opening and in a same axial area as the discharge opening.

3. The inflow element in accordance with claim 1, wherein the flow guide elements are arranged at least one of with an equal pitch and with a pitch in a same direction in relation to a principal direction of inflow.

4. The inflow element in accordance with claim 3, wherein upstream end areas of the flow guide elements, in relation to the principal direction of inflow, are offset in relation to downstream end areas of the flow guide elements, in a circumferential direction.

5. The inflow element in accordance with claim 1, wherein the inflow opening arrangement is arranged at least one of axially opposite the space area formed between the outer circumferential wall and the inner circumferential wall and essentially in the same radial area.

6. The inflow element in accordance with claim 1, wherein the space area formed between the outer circumferential wall and the inner circumferential wall is defined axially by another bottom area.

7. The inflow element in accordance with claim 6, wherein:
the another bottom area comprises a bottom wall; and
the bottom wall of the another bottom area is of a ring-shaped design.

8. The inflow element in accordance with claim 6, wherein:
the another bottom area comprises a bottom wall; and
the bottom wall of the another bottom area is located axially opposite the inflow opening arrangement.

9. The inflow element in accordance with claim 6, wherein:
the another bottom area comprises a bottom wall; and
the bottom wall of the another bottom area adjoins the outer circumferential wall and the inner circumferential wall.

10. An inflow assembly unit for a first combustion air inflow path for a vehicle heater, the inflow assembly unit comprising
an inflow element comprising:
a bottom area;
an outer circumferential wall adjoining the bottom area and extending essentially in the direction of a central longitudinal axis of the inflow element;
an inner circumferential wall arranged at a radially spaced location from the outer circumferential wall and axially overlapping with the outer circumferential wall, such that a space area is defined radially between the inner circumferential wall and the outer circumferential wall, the inner circumferential wall ending at a spaced location from the bottom area in a direction of the central longitudinal axis and defining a discharge opening; and
an inflow opening arrangement comprising a plurality of inflow openings arranged following each other in a circumferential direction about the central longitudinal axis for the inflow of air into the inflow element, the inflow opening arrangement being provided in the bottom area and being designed to generate a turbulent flow, the inflow opening arrangement and the space area defined radially between the inner circumferential wall and the outer circumferential wall being provided in a same radial area, such that the inflow openings are located axially opposite the space area;
an air flow sound muffler comprising an air inlet area, for receiving air flowing through the inflow element.

11. The air inflow assembly unit in accordance with claim 10, wherein:
the inflow openings are in connection with the discharge opening surrounded by the inner circumferential wall.

12. The inflow assembly unit in accordance with claim 11, wherein in the inflow opening arrangement:
the plurality of inflow openings are arranged such that they follow each other around a bottom wall of the bottom area; and
flow guide elements associated with the inflow openings.

13. The inflow assembly unit in accordance with claim 12, wherein:
the bottom wall is arranged essentially centrally in relation to the central longitudinal axis; and
the bottom wall is arranged at least one of axially opposite a discharge opening and in a same axial area as the discharge opening.

14. The inflow assembly unit in accordance with claim 12, wherein one of the flow guide elements is provided between at least two of the inflow openings that follow each other.

15. The inflow assembly unit in accordance with claim 12, wherein the inflow openings are arranged in a ring-shaped configuration around the bottom wall.

16. An inflow element for an air inflow path, the inflow element comprising:
a bottom wall;
a substantially cylindrical outer circumferential wall adjoining said bottom wall at an axial end of said outer circumferential wall, said outer circumferential wall having a longitudinal axis;
an inner circumferential wall arranged at a radially spaced location from said outer circumferential wall, said inner circumferential wall and said outer circumferential wall axially overlapping with respect to said longitudinal axis, said inner circumferential wall and said outer circumferential wall defining a space area, said space area being radially between said inner and outer circumferential wall where said inner and outer circumferential wall axially overlap; and
an inflow opening arrangement provided in said bottom wall, said inflow opening arrangement defining a plurality of inflow openings arranged in a circumferential direction about said longitudinal axis, said inflow openings being positioned radially between said inner and outer circumferential wall, said inflow openings being positioned axially opposite said space area, said inflow openings being shaped to generate a turbulent flow in said space area.

17. The inflow element in accordance with claim 16, wherein:
the inflow openings are radially tapering in a direction of flow.

* * * * *